(12) United States Patent
Sun et al.

(10) Patent No.: US 7,705,912 B2
(45) Date of Patent: Apr. 27, 2010

(54) METHOD FOR PROCESSING A DIGITAL VIDEO SIGNAL

(75) Inventors: Jianhua Sun, Singapore (SG); Sapna George, Singapore (SG)

(73) Assignee: STMicroelectronics Asia Pacific Pte, Ltd., Singapore (SG)

( * ) Notice: Subject to any disclaimer, the term of this patent is extended or adjusted under 35 U.S.C. 154(b) by 1401 days.

(21) Appl. No.: 10/795,796

(22) Filed: Mar. 8, 2004

(65) Prior Publication Data
US 2004/0240862 A1 Dec. 2, 2004

(30) Foreign Application Priority Data
Mar. 7, 2003 (SG) .............................. 200301441-2

(51) Int. Cl.
*H04N 7/12* (2006.01)
*G10L 19/00* (2006.01)
(52) U.S. Cl. .................. 348/423.1; 704/500; 704/501; 704/502
(58) Field of Classification Search .............. 704/500, 704/501, 502; 348/423.1
See application file for complete search history.

(56) References Cited

U.S. PATENT DOCUMENTS 6,226,443 B1 * 5/2001 Morioka et al. ............... 386/82
6,876,814 B1 * 4/2005 Le Dantec .................. 386/109

FOREIGN PATENT DOCUMENTS

KR 98053617 * 9/1998

* cited by examiner

*Primary Examiner*—Marsha D Banks Harold
*Assistant Examiner*—Asher Khan
(74) *Attorney, Agent, or Firm*—David V. Carlson; Lisa K. Jorgenson

(57) ABSTRACT

A method of decoding audio data, encoded in multiple DIF blocks in a Digital Video (DV) data stream, and outputting said audio data as a PCM frame, includes fetching a single Digital Interface Frame (DIF) block from the DV data stream. A first byte in the single DIF block is de-shuffled to determine its index (n) in the PCM frame. Each byte in the in the single DIF block is de-shuffled to determine its respective index (n) in the PCM frame. The de-shuffled data is written into the PCM frame for output if the present DIF block is the last in the present DV frame. Subsequent DIF blocks in the DV frame are processed in the manner described above.

20 Claims, 4 Drawing Sheets

| Sync blk number | 2 Sync Area | 3 ID Code | 5 AAUX Data | ←――― 72 bytes ―――→ Audio Data | 8 Inner Parity |
|---|---|---|---|---|---|
| 2 | | | | | |
| 3 | | | | | |
| 4 | | | | | |
| ⋮ | ⋮ | ⋮ | ⋮ | ⋮ | ⋮ |
| 8 | | | | | |
| 9 | | | | | |
| 10 | | | | | |
*FIG. 1*
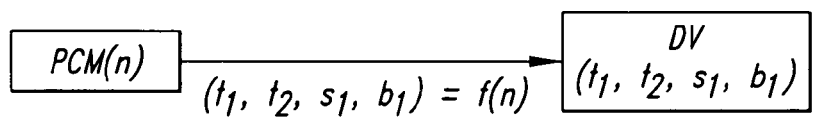
*FIG. 2*
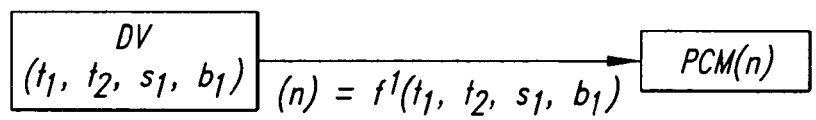
*FIG. 4*

METHOD FOR PROCESSING A DIGITAL VIDEO SIGNAL

BACKGROUND OF THE INVENTION

1. Field of the Invention

The present invention relates to a method of decoding an audio signal included in a Digital Video (DV) data stream. The DV format is commonly used to store video and audio sourced from domestic camcorders. The data format is adapted to store both data related to the video signal and the audio signal. Both signals are generally decoded separately.

2. Description of the Prior Art

The audio part of DV data is formatted to include:
Audio Pre-amble
14 Data-Sync blocks, each including:
  a Sync area of 2 bytes
  an ID code of 3 bytes
  a data area of 85 bytes
Audio Post-amble The format of the data-sync blocks is shown in FIG. 1.

When the audio data is encoded and stored in DV format, audio samples and data are shuffled over different tracks and data-sync blocks within an audio frame. Firstly, audio data is shuffled, and then dummy data is added. The position of the $n^{th}$ audio sample is determined from the equations (1)-(6) which follow:

$$\begin{cases} t_1 = [\lfloor n/3 \rfloor + 2*(n\%3)]\%T & (CH1) \quad (1) \\ t_2 = [\lfloor n/3 \rfloor + 2*(n\%3)]\%T + T & (CH2) \quad (2) \\ s_1 = C_1 + 3*(n\%3) + \lfloor (n\%K_1)/K_2 \rfloor & (3) \\ b_1 = C_2 + B*\lfloor n/K_1 \rfloor & \text{(byte 1)} \quad (4) \\ b'_1 = C_2 + 1 + B*\lfloor n/K_1 \rfloor & \text{(byte 2)} \quad (5) \\ b''_1 = C_2 + 2 + B*\lfloor n/K_1 \rfloor & \text{(byte 3 for 4-ch mode)} \quad (6) \end{cases}$$

In relation to the above equations, R is the set of all real numbers, Z is the set of all integers (positive and negative), N is the set of all natural numbers, $t_1$ and $t_2$ are the track numbers for channel 1 and channel 2 respectively, $s_1$ is the sync block number, and $b_1$ is the byte position within the DIF block. A DIF (Digital Interface Frame) block is a sub-part of a DV frame. A DV frame includes either 90 or 108 DIF frames depending on whether the system is 525/60 or 625/50. FIG. 5 illustrates the relationship between a DV frame and a DIF block, where the dotted box represents a DV frame, while each individual row of data samples represents a DIF block.

With regard to the notation used in this specification, [a,b] indicates a range inclusive of both a and b; (a,b] indicates a range exclusive of a, but inclusive of b; and [a,b) indicates a range inclusive of a, but exclusive of b.

If x is a real number (x∈R), then [x] indicates the largest integer that is ≦x, and x%y indicates the remainder of the division of x by y, where x, y∈N. By number theory, x%y∈[0, y).

It can be seen from equations (4)-(6) that bytes belonging to the same sample are distributed consecutively within the same DIF block. Samples from different channels but with the same indices have the same sync block number and byte position but different track numbers. The relationship between sync-blocks and tracks is illustrated in Table 1, which shows how they are related to the sample index and the constants T, $K_1$, $K_2$, and B.

The coding process involves a shuffling operation which maps from the PCM (Pulse Code Modulation) domain to the DV domain. FIG. 2 shows a top level block diagram of the mapping operation, showing how the raw PCM data is mapped on the basis of $t_1$, $t_2$, $s_1$ and $b_1$ into DV format. FIG. 3 shows a more detailed view of the shuffling of particular samples, in which the left hand side shows a PCM frame with data samples $D_0 \ldots D_N$. The dotted rectangle on the right hand side shows a DV frame. For each PCM sample, $D_n$, its index, n, is used as the input to the shuffling equations (1) to (6) to determine its corresponding position in the DV frame. That is, $(t_1, s_1, b_1) = f(n) \Rightarrow DV[t_1][s_1][b_1] = PCM[n] = D_n$.

The values T, B, $K_1$ and $K_2$ are system dependent and are summarized in the table below, along with the constants C1 and C2.

TABLE I

| System | T | $K_1$ | $K_2$ | B | $C_1$ | $C_2$ |
|---|---|---|---|---|---|---|
| 2-ch 525/60 | 5 | 45 | 15 | 2 | 2 | 10 |
| mode 625/50 | 6 | 54 | 18 | 2 | 2 | 10 |
| 4-ch 525/60 | 5 | 45 | 15 | 3 | 2 | 10 |
| MODE 625/50 | 6 | 54 | 18 | 3 | 2 | 10 |

The numbers in the System column of the above table refer to the number of lines in the video system and the refresh rate. So, 525/60 is a 525 line TV system with a 60 Hz refresh rate.

The DV audio signal is decoded to enable the audio to be reproduced by playback equipment, such as a video cassette player. If the shuffled coded data may be represented as $(t_1, t_2, s_1, b_1) = f(n)$, then the reverse mapping $f^{-1}$ may be considered to provide the correct order of data. This concept is shown in FIG. 4.

However, this concept is not generally possible in practice, as the shuffling process involves modular and non-linear operations, such as $\lfloor x \rfloor$, which result in a one-to-many reverse relationship. It is therefore not generally possible to easily find a suitable reverse mapping $f^{-1}$.

Prior art DV audio decoders therefore generally operate in one of two known ways. The first way involves the creation of a Look Up Table (LUT) in which a mapping relationship between received data and the required output data is pre-computed and stored to enable the received data to be re-formatted accordingly.

This method includes the following steps:
Every element in the table is initialized to −I;
For every n∈[0,N], computer $(t_1, s_1, b_1)$ using the shuffling equations (1)-(6);
Store values for n in a LUT with index $[t_1, s_1, b_1]$, i.e., $LUT[t_1][s_1][b_1]=n$;
For any incoming shuffled data byte, determine its position in the raw PCM data:
  IF $LUT[t_1][s_1][b_1]=-1$ THEN discard value,
  ELSE $PCM[LUT[t_1][s_1][b_1]]=DV[t_1][s_1][b_1]$ The major disadvantage of this particular method is the large amount of memory required to store the LUT. Since the constants (T, $K_1$, $K_2$ and B) involved in the shuffling equations can be of different values depending on whether it is a 525/60 or 625/50 system, or a 2 or 4-channel system, four separate look-up tables are required. Each LUT is similar in size to a DV frame.

The second method involves receiving and buffering an entire DV audio frame, which is then analyzed so that the received data can be decoded on the basis of the analysis.

Using this method, there is no requirement to explicitly determine the reverse mapping $f^{-1}$, but it has the drawback that an entire DV audio frame has to be buffered or stored before decoding can start. This is because a sample occurring in the very first position of the raw PCM data may be shuffled to a position very late in the DV frame. Therefore, this technique may only be used once a complete DV audio frame is available.

To use this method, values of $(t_1, s_1, b_1)$ are calculated for n=0 to N. i.e., $(t_1, s_1, b_1)$=f(n). Then PCM[n]=DV[$t_1$][$s_1$][$b_1$]

The prior art methods are problematic in that they both require relatively large amounts of memory in order to either store the LUT or buffer the received signal for further analysis. The methods themselves are relatively straightforward to implement, but the memory requirements render them undesirable in practical systems.

BRIEF SUMMARY OF THE PRESENT INVENTION

In a first broad form, one embodiment of the present invention provides method of decoding audio data, encoded in multiple DIF blocks in a Digital Video (DV) data stream, and outputting said audio data as a PCM frame, including the following steps:

(i) fetching a single Digital Interface Frame (DIF) block from the DV data stream;

(ii) de-shuffling a first byte in the single DIF block to determine its index (n) in the PCM frame;

(iii) repeating step (ii) until the last byte in the single DIF block is processed;

(iv) writing the de-shuffled data into the PCM frame for output if the present DIF block is the last in the present DV frame;

(v) repeat steps (i) to (iv).

By needing only a single DIF block in order to de-shuffle the received data, embodiments of the present invention offer advantages over prior an solutions which require receipt of as entire DV frame consisting of many tens of DIF blocks, or storage of large LUTs, before de-shuffling can begin.

Preferably, the index (n) of a particular data sample in the output PCM frame is dependent on parameters of the DV data.

Preferably, the parameters include:

track number (t)

sync block number (s)

byte position within the DIF block (b)

Preferably, for the first DIF block of a new frame, t, s and a DIF block counter are set to zero.

Preferably, s is incremented by 1 each time a new DIF block is received, and is reset to zero every nine DIF blocks.

Preferably, t is incremented by 1 every nine DIF blocks.

Preferably, the DV data may be encoded to one of a plurality of different video systems, such as 525/60 (2-channel or 4-channel) or 625/50 (2-channel or 4-channel).

Preferably, each different video system may be characterized by several different constants used in the encoding and decoding of data, these constants being:

| System | | T | $K_1$ | $K_2$ | B | $C_1$ | $C_2$ |
|---|---|---|---|---|---|---|---|
| 2-ch | 525/60 | 5 | 45 | 15 | 2 | 2 | 10 |
| mode | 625/50 | 6 | 54 | 18 | 2 | 2 | 10 |
| 4-ch | 525/60 | 5 | 45 | 15 | 3 | 2 | 10 |
| MODE | 625/50 | 6 | 54 | 18 | 3 | 2 | 10 |

Preferably, the de-shuffling of data in the single DIF block is performed according to the de-shuffling equation:

$$n = f^{-1}(t_1, s_1, b_1)$$
$$= K_1 x_1 + K_2 x_2 + c$$
$$= K_1(b_1/B) + K_2(s_1 \% 3) + (m' + T \div t_1 - 2*\lfloor s_1/3 \rfloor)*3 + \lfloor s_1/3 \rfloor$$
$$\text{where} \begin{cases} \text{if}(t_1 - 2*\lfloor s_1/3 \rfloor) < 0, m' = 1 \\ \text{else if}(t_1 - 2*\lfloor s_1/3 \rfloor) \geq 0, m' = 0 \end{cases}$$

where $t_1, s_1, b_1$ are the track, sync block and byte numbers respectively, included in the single DIF block, and $K_1, K_2$ and B are constants characterizing a particular coding scheme.

In one of the prior art methods, shuffling equations are used for de-shuffling purposes. In this prior method, values of $(t_1, s_1, b_1)$ are calculated for n=0 to N, i.e., $(t_1, s_1, b_1)$=f(n), which leads to PCM[n]=DV[$t_1$][$s_1$][$b_1$].

It is noted that values of n run sequentially, whereas values of $(t_1, s_1, b_1)$ do not. This means that for a small n, the corresponding DV byte may appear in the very last part of the frame. This means that an entire DV frame needs to be buffered in this method, resulting in the storage of a large amount of transient data.

By contrast, embodiments of the present invention use reverse mapping relationship $f^{-1}$ which enables the position in the raw PCM frame to be determined directly for any given data byte in the DV frame.

In a second broad form, the present invention also provides apparatus for performing the method of the first broad form of the invention. The apparatus is preferably a custom Digital Signal Processor (DSP).

BRIEF DESCRIPTION OF THE DRAWINGS

For a better understanding of the present invention and to understand how the same may be brought into effect, the invention will now be described by way of example only, with reference to the appended drawings in which:

FIG. 1 shows the format of the audio part of a DV data frame;

FIG. 2 shows the shuffling of raw PCM data to encode it as part of a DV data stream;

FIG. 4 shows the de-shuffling of DV data to produce PCM data;

DETAILED DESCRIPTION OF THE INVENTION

Figure 3:
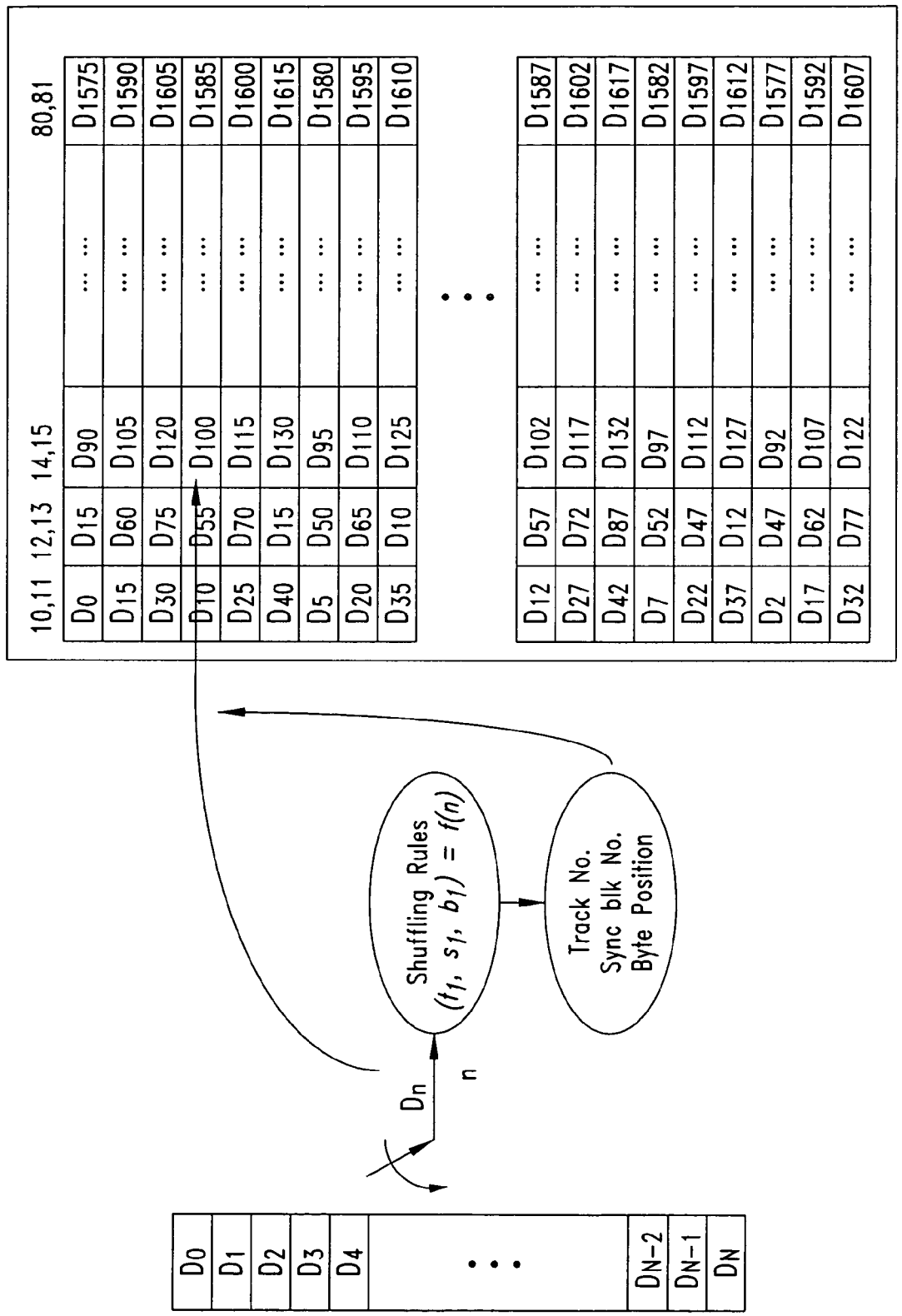
FIG. 3 shows how a PCM frame is shuffled according to the shuffling equations to produce DIF blocks within the DV data frame.

Preferred embodiments of the invention are able to decode a received DV audio stream based on analysis of a single DIF block rather than on an entire audio frame as per the prior art solutions.

In the following description, the following formula is used:

For $\forall m, n \in N$, or in other words, for any m, n is a Natural Number, and $$n = \lfloor n/m \rfloor * m + n\%m \tag{7}$$

The constants $C_1$ and $C_2$ can be excluded from equations (1)-(6) without any loss of generality. The equations may therefore be re-written as follows, although the byte positions and sync block number are now offset.

$$\begin{cases} t_1 = [\lfloor n/3 \rfloor + 2*(n\%3)]\%T & (CH1) & (8) \\ t_2 = [\lfloor n/3 \rfloor + 2*(n\%3)]\%T + T & (CH2) & (9) \\ s_1 = 3*(n\%3) + \lfloor (n\%K_1)/K_2 \rfloor & (10) \\ & (\text{byte 1}) & (11) \\ b_1 = B*(n\%K_1) & (\text{byte 2}) & (12) \\ b_1' = 1 + B*(n\%K_1) & (\text{byte 3 for 4-}ch) & (13) \end{cases}$$

The various constants which were included in equations (1) to (6) can be excluded at this stage as they are invariant within a particular format of DV data (e.g., 2-channel 525/60). The sync block number and byte positions are effectively offset to absorb $C_1$ and $C_2$.

As all data bytes belonging to the same audio sample are distributed consecutively within the same DIF block, (from equations (11)-(13)), once the first byte in a sample is located, the other bytes may be easily located. The following derivation is for channel one and the first data byte only. The other bytes may be found as described from this information.

$$\lfloor (n\%K_1)/K_2 \rfloor = x_2 \tag{14}$$

$$\Rightarrow n\%K_1 = K_2 x_2 + c \ (c \in Z \text{ and } 0 \leq c < K_2) \tag{15}$$

$$\Rightarrow n = K_1 x_1 = K_2 x_2 + c \tag{16}$$

Where $x_1 = \lfloor n/K_1 \rfloor = b_1/B$. \hfill (17)

From equations (14)-(16) and equation (10), it can be seen that:

$$x_2 = s_1 \% 3 \tag{18}$$

$$c\%3 = n\%3 \tag{19}$$

$$\lfloor s_1/3 \rfloor = n\%3 \tag{20}$$

$$c\%3 = \lfloor s_1/3 \rfloor. \tag{21}$$

Equation (16) then yields:

$$\lfloor n/3 \rfloor = \lfloor (K_1 x_1)/3 \rfloor + \lfloor (K_2 x_2)/3 \rfloor + \lfloor c/3 \rfloor \tag{22}$$

$$t_1 = [\lfloor n/3 \rfloor + 2*(n\%3)]\%T$$

$$\Rightarrow \lfloor n/3 \rfloor = m*T + t_1 - 2*(n\%3) \biggr\}$$
Equation (14)

$$\Rightarrow \lfloor c/3 \rfloor = m*T + t_1 - 2*(c\%3) = m*T + t_1 - 2*(s_1/3),$$

where $m' = m - \lfloor (K_1 x_1)/3 \rfloor / T - \lfloor (K_2 x_2)/3 \rfloor / T$.

In order to evaluate m, the constraints of the various parameters may be used as follows:

$$\left.\begin{array}{l}-(T-1) \leq m'T \leq (T+3) \Rightarrow m' \in \{0, 1\} \\ m'*T + t_{1-2}*\lfloor s_1/3 \rfloor = \lfloor c/3 \rfloor \Rightarrow 0 \leq m'*T + t_1 - 2*\lfloor s_1/3 \rfloor < T\end{array}\right\} \tag{23}$$

$$\Rightarrow \begin{cases} \text{if}(t_1 - 2*\lfloor s_1/3 \rfloor) < 0, m' = 1 \\ \text{else if}(t_1 - 2*\lfloor s_1/3 \rfloor) \geq 0, m' = 0 \end{cases}$$

Equations (16)-(18), (22) and (23) can then be used to define the reverse mapping, $f^{-1}$ as:

$$\begin{aligned} n &= f^{-1}(t_1, s_1, b_1) \\ &= K_1 x_1 + K_2 x_2 + c \\ &= K_1(b_1/B) + K_2(s_1\%3) + (m'*T + t_1 - 2*\lfloor s_1/3 \rfloor) * \\ &\quad 3 + \lfloor s_1/3 \rfloor \end{aligned} \tag{24}$$

$$\text{where}\begin{cases} \text{if}(t_1 = 2*\lfloor s_1/3 \rfloor) < 0, m' = 1 \\ \text{else if}(t_1 - 2*\lfloor s_1/3 \rfloor) \geq 0, m' = 0 \end{cases}$$

Figure 5:
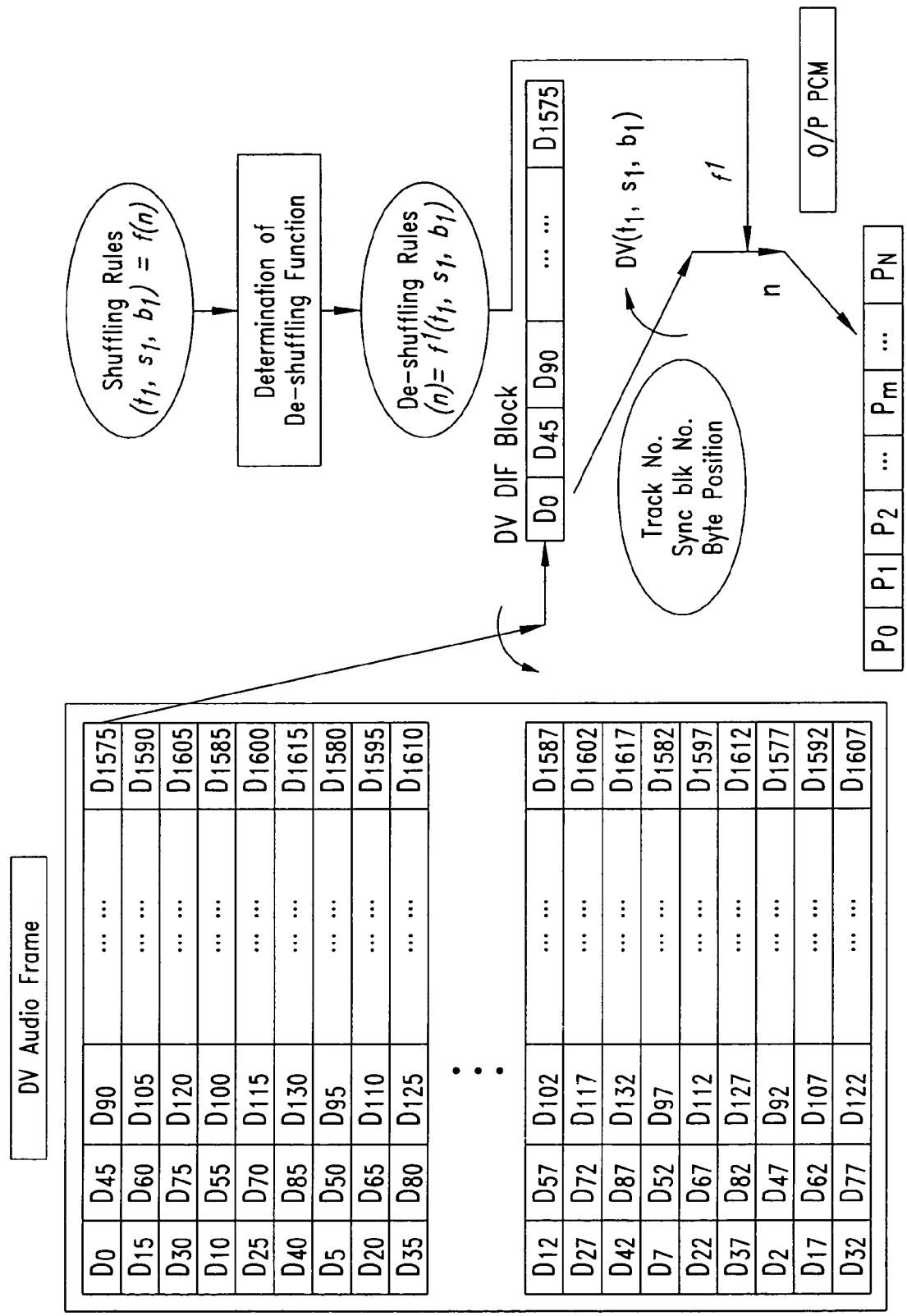
FIG. 5 shows how DV data is de-shuffled according to de-shuffling equations and output as PCM data.

FIG. 5 illustrates the 525/60 system. It is apparent that suitable changes may be made in order to adapt the process for other previously mentioned systems such as 625/50.

The process illustrated in FIG. 5 includes the following steps:

1. The explicit de-shuffling expression is determined from the shuffling equations. This process to find $f^{-1}$ from f has already been described, and is performed off-line, i.e., it is not necessary to perform the operation in real-time as it may be performed in advance of receipt of the DV data stream.

2. One DIF block at a time is read from the external data stream. The indices of the DV data ($t_1$, $s_1$, $b_1$) are used as the input arguments to the $f^{-1}$ process. This allows the position n of the appropriate byte in the PCM data to be determined. The same value n is then also used for the subsequent (B−1) byte(s).

3. If the system is operating 2-channel mode, then PCM[n]= DV($t_1$, $s_1$, $b_1$)⊕DV($t_1$, $s_1$, $b_1$+1). If the system is not operating in 2-channel mode, then PCM[n]=DV($t_1$, $s_1$, $b_1$)⊕DV($t_1$, $s_1$, $b_1$+1)⊕DV($t_1$, $s_1$, $b_1$+2).

4. Steps 2 and 3 above are repeated until all the DIF blocks in the received DV audio frame are de-shuffled.

5. Post process the de-shuffled data, if necessary, and output as a PCM frame.

A preferred method of performing the de-shuffling operation is to use a suitably programmed DSP (Digital Signal Processor). A single DIF block may be fetched from an external memory to an internal memory of the DSP. The DIF block includes system specific information from which the constants $K_1$, $K_2$, T and B may be determined. These constants are used in the subsequent processing.

For the first DIF block of a new frame, the Sync block number $s_1$, track number $t_1$, and the DIF block counter are reset to zero. Whenever a new DIF block is received, $s_1$ is incremented by 1, and is reset to zero every nine DIF blocks. Then $t_1$ is incremented by 1 every nine DIF blocks. Each received DIF block includes 72 data bytes which correspond to 72/B samples.

The shuffling equations reveal that individual data bytes belonging to the same data sample are distributed consecutively in the same DIF block. Making use of this fact, equation 24 is applied to only the first byte of each sample. This first byte, together with the B−1 bytes which follow it are used to determine the PCM sample with index n calculated by the de-shuffling equations.

Figure 6:
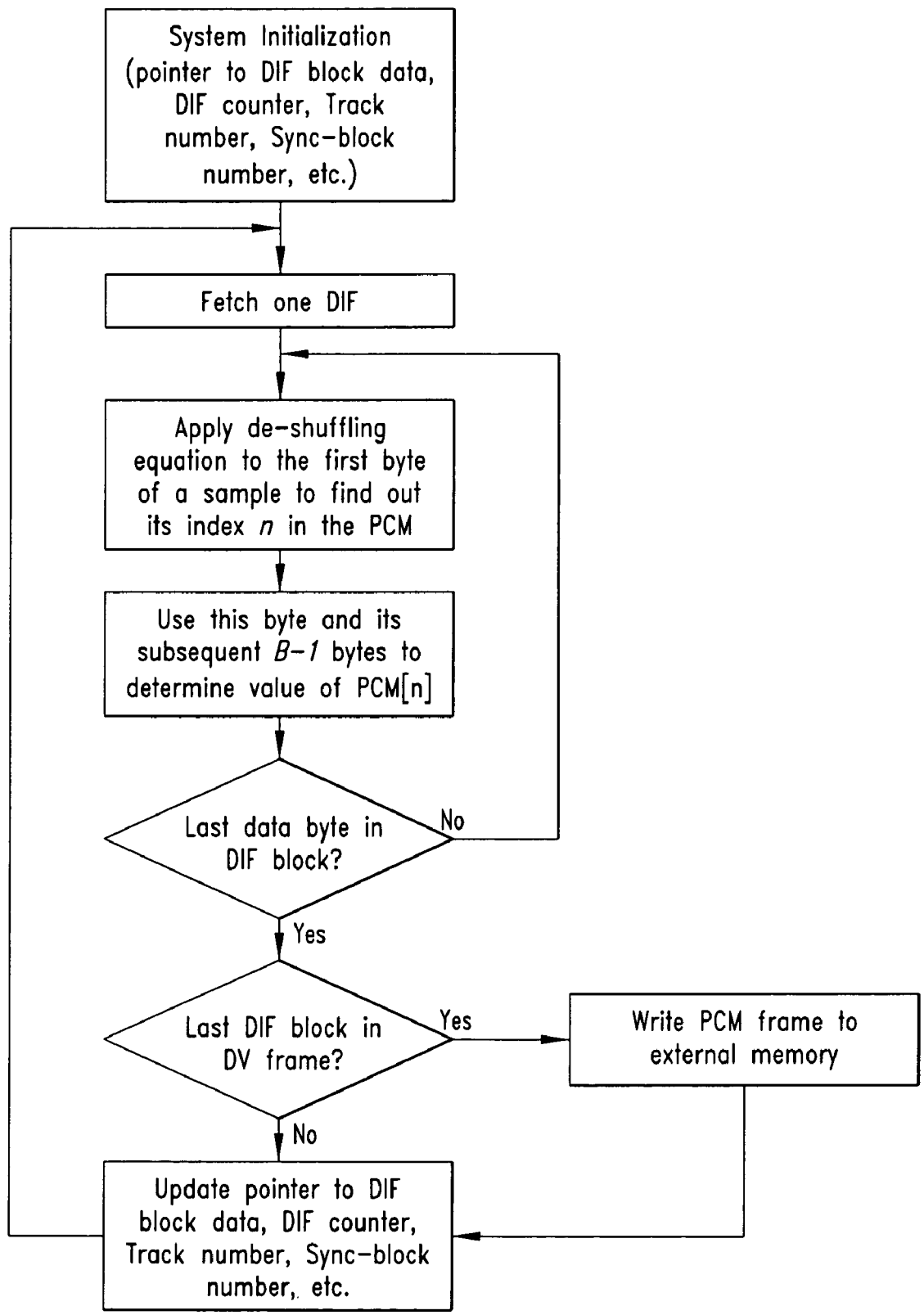
FIG. 6 shows a flowchart detailing the steps in the de-shuffling process.

The pointer to the DIF block data is then incremented by B so that it points to the first byte of the next sample. When all the DIF blocks in a DV frame have been processed as described, the desired number of samples which have been stored in the PCM buffer are written to the external memory, as shown in FIG. 6.

In contrast to prior art decoding systems, therefore, embodiments of the present invention do not require an entire DV audio frame to be received before the decoding process can begin. Also, them is no need to prepare and store a large look up table, saving the overhead of providing relatively large amounts of memory.

Many embodiments of the invention, using the explicit reverse mapping relationships described previously, are able to directly compile PCM data from incoming DV audio data, requiring only a single DIF block at any one time. The indices $t_1$, $s_1$, $b_1$ are all that is required to determine the position of the data in the original PCM frame.

The following table shows the reduction in memory which can be achieved through use of embodiments of the invention with different video standards.

| System | Conventional Method (Entire DV Frame Basis) | Embodiments of the Invention (DIF Block Basis) | Memory Reduction Factor |
|---|---|---|---|
| NTSC | 10 * 9 DIF blocks = 10 * 9 * 80 bytes = 7200 bytes | 1 DIF block = 80 bytes | 90 |
| PAL | 12 * 9 DIF blocks = 12 * 9 * 80 bytes = 8640 bytes | 1 DIF block = 80 bytes | 108 |

The following table illustrates the reduction in different processing operations which can be achieved through use of embodiments of the invention.

| Operation | Conventional Method (Entire DV Frame Basis) | Embodiments of the Invention (DIF Block Basis) | Reduction Factor |
|---|---|---|---|
| Modular Operation | 3/sample | 1/sample | 67% |
| Division | 3/sample | 2/sample | 33% |

It can be see that embodiments of the invention are able to provide decoding of DV audio data using significantly less physical memory, and requiring significantly fewer processing operations to achieve the same resultant data as can be achieved by prior art solutions.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

In the light of the foregoing description, it will be clear to the skilled person that various modifications may be made within the scope of the invention.

The present invention includes any novel feature or combination of features disclosed herein either explicitly or any generalization thereof irrespective of whether or not it relates to the claimed invention or mitigates any or all of the problems addressed.

The invention claimed is:

1. A method of decoding audio data, encoded in multiple DIF blocks in a Digital Video (DV) frame of a DV data stream, and outputting said audio data as a PCM frame, the method comprising:
   (i) fetching a single Digital Interface Frame (DIF) block from the DV data stream, the DIF block having a plurality of bytes including a first byte and a last byte;
   (ii) de-shuffling the first byte in the single DIF block to determine its index (n) in the PCM frame;
   (iii) for each subsequent byte of data of the single DIF block, de-shuffling the subsequent byte until the last byte in the single DIF block is de-shuffled;
   (iv) repeating (i) to (iii) for each subsequent DIF block of the multiple DIF blocks in the DV frame; and
   (v) writing the de-shuffled data into the PCM frame for output after each DIF block of the multiple DIF blocks of the DV frame have been fetched from the DV data stream.

2. A method as claimed in claim 1 wherein the index (n) of a particular data sample in the output PCM frame is dependent on parameters of the DV data.

3. A method as claimed in claim 2 wherein the parameters include:
   track number (t);
   sync block number (s); and
   byte position within the DIF block (b).

4. A method as claimed in claim 3 wherein for a first DIF block of the DV frame, t, s and a DIF block counter are set to zero.

5. A method as claimed in claim 4 wherein s is incremented by 1 each time a new DIF block is received, and is reset to zero every nine DIF blocks.

6. A method as claimed in claim 5 wherein t is incremented by 1 every nine DIF blocks.

7. A method as claimed in claim 1 wherein the DV data may be encoded to one of a plurality of different video systems, such as 525/60 (2-channel or 4-channel) or 625/50 (2-channel or 4-channel).

8. A method according to claim 7 wherein each different video system is characterized by several different constants used in the encoding and decoding of data, these constants being:

| System | | T | $K_1$ | $K_2$ | B | $C_1$ | $C_2$ |
|---|---|---|---|---|---|---|---|
| 2-ch mode | 525/60 | 5 | 45 | 15 | 2 | 2 | 10 |
| | 625/50 | 6 | 54 | 18 | 2 | 2 | 10 |
| 4-ch MODE | 525/60 | 5 | 45 | 15 | 3 | 2 | 10 |
| | 625/50 | 6 | 54 | 18 | 3 | 2 | 10. |

9. A method as claimed in claim 1 wherein the de-shuffling of data in the single DIF block is performed according to the de-shuffling equation:

$$n = f^{-1}(t_1, s_1, b_1)$$
$$= K_1 x_1 + K_2 x_2 + c$$
$$= K_1 \lfloor b_1/B \rfloor + K_2(s_1 \% 3) + (m' + T \div t_1 - 2*\lfloor s_1/3 \rfloor)*3 + \lfloor s_1/3 \rfloor$$

$$\text{where} \begin{cases} \text{if}(t_1 - 2*\lfloor s_1/3 \rfloor) < 0, m' = 1 \\ \text{else if}(t_1 - 2*\lfloor s_1/3 \rfloor) \geq 0, m' = 0 \end{cases}$$

where $t_1$, $s_1$, $b_1$ are the track, sync block and byte numbers respectively, included in the single DIF block, and $K_1$, $K_2$ and B are constants characterizing a particular coding scheme.

10. A method of decoding audio data, encoded in multiple DIF blocks in a Digital Video (DV) frame of a DV data stream, and outputting said audio data as a PCM frame, the method comprising:
fetching a single Digital Interface Frame (DIF) block from the DV data stream, the DIF block having a plurality of bytes including a first byte and a last byte;
de-shuffling the first byte in the single DIF block to determine its index (n) in the PCM frame;
determining, until the last byte, indexes in the PCM frame for subsequent bytes of the single DIF block from the index determined for the first byte; and
repeating the fetching, de-shuffling, and determining for subsequent DIF blocks in the DV frame; and
writing the de-shuffled bytes into the PCM frame for output after each DIF block of the multiple DIF blocks of the DV frame have been fetched from the DV data stream.

11. The method of claim 10 wherein the de-shuffling includes determining the index (n) in the PCM frame of the first byte based on parameters of the single DIF block without using any parameters of the DIF blocks other than the single DIF block.

12. The method of claim 11 wherein the parameters of the single DIF block include:
track number (t);
sync block number (s); and
byte position within the DIF block (b).

13. The method of claim 12 wherein for a first DIF block of the DV frame, t, s and a DIF block counter are set to zero.

14. The method of claim 12 wherein s is incremented by 1 each time a new DIF block is received, and is reset to zero every nine DIF blocks.

15. The method of claim 12 wherein t is incremented by 1 every nine DIF blocks.

16. The method of claim 10 wherein the de-shuffling is performed according to the de-shuffling equation:

$$n = f^{-1}(t_1, s_1, b_1)$$
$$= K_1 x_1 + K_2 x_2 + c$$
$$= K_1 \lfloor b_1/B \rfloor + K_2(s_1 \% 3) + (m' + T \div t_1 - 2*\lfloor s_1/3 \rfloor)*3 + \lfloor s_1/3 \rfloor$$

$$\text{where} \begin{cases} \text{if}(t_1 - 2*\lfloor s_1/3 \rfloor) < 0, m' = 1 \\ \text{else if}(t_1 - 2*\lfloor s_1/3 \rfloor) \geq 0, m' = 0 \end{cases}$$

where $t_1$, $s_1$, $b_1$ are the track, sync block and byte numbers respectively, included in the single DIF block, and $K_1$, $K_2$ and B are constants characterizing a particular coding scheme.

17. A method of decoding audio data, encoded in multiple DIF blocks in a Digital Video (DV) frame and outputting said audio data as a PCM frame, the method comprising:
for each DIF block of the multiple DIF blocks in the DV frame, obtaining a single respective Digital Interface Frame (DIF) block the single respective DIF block having a plurality of bytes including a first byte and a last byte,
de-shuffling the first byte of data in the single respective DIF block based on a calculation to determine an index (n) of the first byte in the PCM frame,
de-shuffling a respective subsequent byte of data in the single respective DIF block until the last byte in the single respective DIF block is de-shuffled based at least on the index (n) of the first byte in the single respective DIF block; and
writing the de-shuffled data into the PCM frame for output after each DIF block of the multiple DIF blocks in the DV frame have been fetched.

18. The method of claim 17 wherein obtaining a single respective Digital Interface Frame (DIF) block further includes fetching the single respective DIF block from a memory.

19. The method of claim 17 wherein obtaining a single respective Digital Interface Frame (DIF) block further includes fetching the single respective DIF block from a DV data stream.

20. The method of claim 1 wherein de-shuffling the subsequent byte until the last byte in the single DIF block is de-shuffled further includes determining indexes in the PCM frame for subsequent bytes of the single DIF block from the index determined for the first byte.

* * * * *